(12) United States Patent
Cho

(10) Patent No.: US 10,851,724 B2
(45) Date of Patent: Dec. 1, 2020

(54) VALVE ASSEMBLY HAVING IMPROVED CYLINDRICAL CAM OPERATION

(71) Applicant: KORENS CO., LTD., Yangsan-si (KR)

(72) Inventor: Hyung Geun Cho, Busan (KR)

(73) Assignee: KORENS CO., LTD., Yangsan-si (KR)

( * ) Notice: Subject to any disclaimer, the term of this patent is extended or adjusted under 35 U.S.C. 154(b) by 0 days.

(21) Appl. No.: 16/474,659

(22) PCT Filed: Jan. 5, 2017

(86) PCT No.: PCT/KR2017/000141
§ 371 (c)(1),
(2) Date: Jun. 28, 2019

(87) PCT Pub. No.: WO2018/124358
PCT Pub. Date: Jul. 5, 2018

(65) Prior Publication Data
US 2020/0191070 A1    Jun. 18, 2020

(30) Foreign Application Priority Data
Jan. 2, 2017  (KR) .................. 10-2017-0000270

(51) Int. Cl.
*F02M 26/68*    (2016.01)
*F16K 31/524*   (2006.01)
(Continued)

(52) U.S. Cl.
CPC ....... *F02D 41/005* (2013.01); *F02D 41/0027* (2013.01); *F02D 41/0065* (2013.01);
(Continued)

(58) Field of Classification Search
CPC ........ F02M 26/54; F02M 26/66; F02M 26/68; F02M 26/69; F16K 31/528; F16K 31/5286
See application file for complete search history.

(56) References Cited

U.S. PATENT DOCUMENTS

| 322,679 A | * | 7/1885 | Campbell | ............... F16H 25/12 |
| | | | | 74/57 |
| 3,818,926 A | * | 6/1974 | Wohlwend | ............ F15B 13/022 |
| | | | | 137/101 |

(Continued)

FOREIGN PATENT DOCUMENTS

| JP | 2014-040792 | 3/2014 |
| KR | 10-2010-0015598 | 2/2010 |

(Continued)

*Primary Examiner* — Sizo V Vilakazi
*Assistant Examiner* — Anthony L Bacon
(74) *Attorney, Agent, or Firm* — Lex IP Meister, PLLC

(57) ABSTRACT

A valve assembly includes: a rotary gear being rotated about a vertical central axis that is a rotational axis by force from an outside, and having a non-circular insertion hole on the central axis; a cylindrical cam being able to move up and down while rotating integrally with the rotary gear with an upper end thereof inserted in the insertion hole, and having two or more inclined slide grooves on an outer side thereof; a poppet shaft disposed through the rotational axis of the cylindrical cam to be able to move up and down integrally with and rotate independently from the cylindrical cam; a valve seat coupled to a lower portion of the poppet shaft; a housing and a cover that surround the cylindrical cam; and two or more bearing unit each having a first side fixed to the housing and having second sides respectively inserted in the slide grooves.

8 Claims, 9 Drawing Sheets

(51) Int. Cl.
    *F16K 31/53*     (2006.01)
    *F16K 31/528*     (2006.01)
    *F02M 26/00*     (2016.01)
    *F02M 26/54*     (2016.01)
    *F02D 41/00*     (2006.01)

(52) U.S. Cl.
    CPC ......... *F02D 41/0077* (2013.01); *F02M 26/68* (2016.02); *F16K 31/524* (2013.01); *F16K 31/528* (2013.01); *F16K 31/5286* (2013.01); *F16K 31/53* (2013.01); *F02M 26/54* (2016.02); *F02M 2026/005* (2016.02)

(56) References Cited

U.S. PATENT DOCUMENTS

| | | | | |
|---|---|---|---|---|
| 6,007,047 | A * | 12/1999 | Phipps | F16K 31/528 251/129.01 |
| 6,534,793 | B1 * | 3/2003 | Heritier-Best | F16K 31/04 251/129.11 |
| 8,651,455 | B2 | 2/2014 | Albert et al. | |
| 8,752,808 | B2 * | 6/2014 | Albert | F16K 31/53 251/229 |
| 9,670,833 | B2 * | 6/2017 | Klipfel | F02M 26/54 |
| 9,745,901 | B2 * | 8/2017 | Albert | F02D 11/04 |
| 2004/0069285 | A1 * | 4/2004 | Telep | F02M 26/69 123/568.23 |
| 2014/0311467 | A1 * | 10/2014 | Lebrasseur | F02M 26/07 123/568.26 |
| 2015/0369120 | A1 * | 12/2015 | Hodebourg | F16K 11/04 123/568.11 |
| 2018/0112593 | A1 * | 4/2018 | Lehnert | F02M 26/66 |
| 2018/0179996 | A1 * | 6/2018 | Cho | F16H 19/001 |

FOREIGN PATENT DOCUMENTS

| | | |
|---|---|---|
| KR | 10-2012-0050967 | 5/2012 |
| KR | 10-1604415 | 3/2016 |
| KR | 10-2016-0103432 | 9/2016 |

* cited by examiner

[Fig. 1]
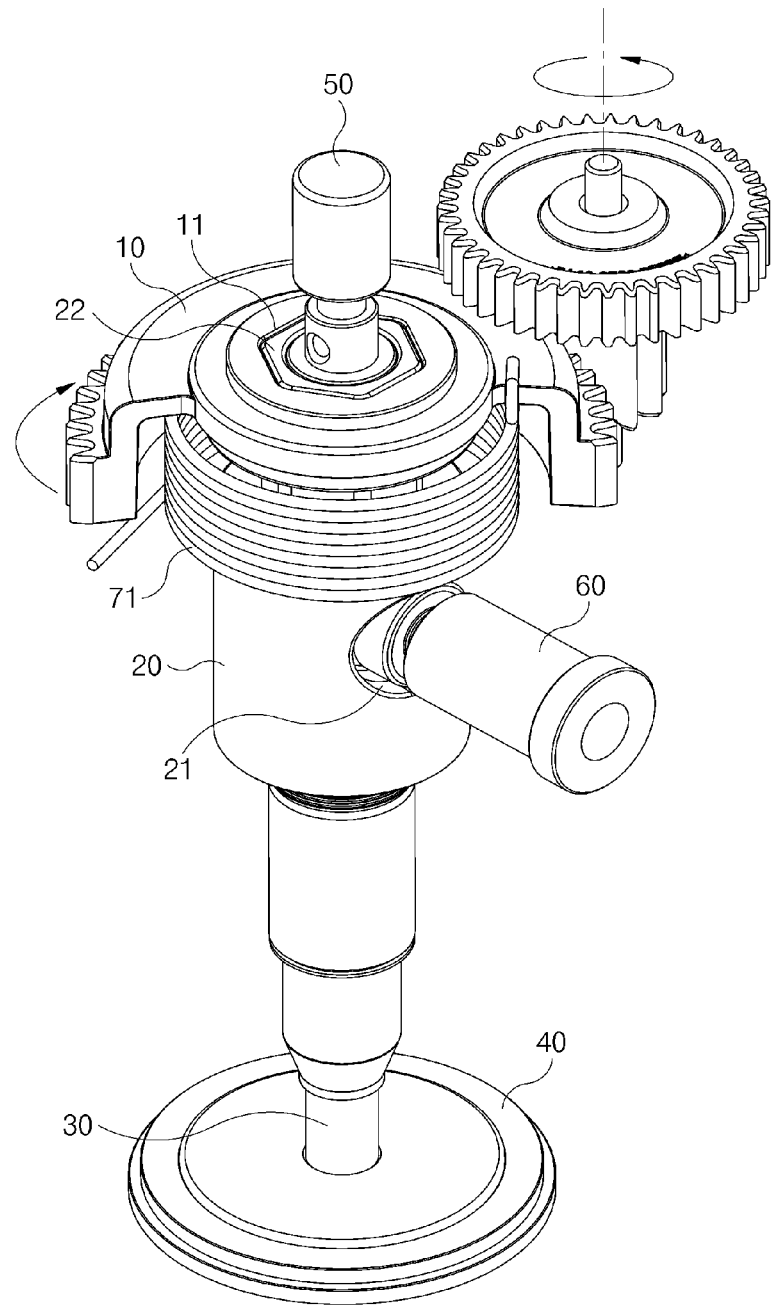
PRIOR ART

[Fig. 2]
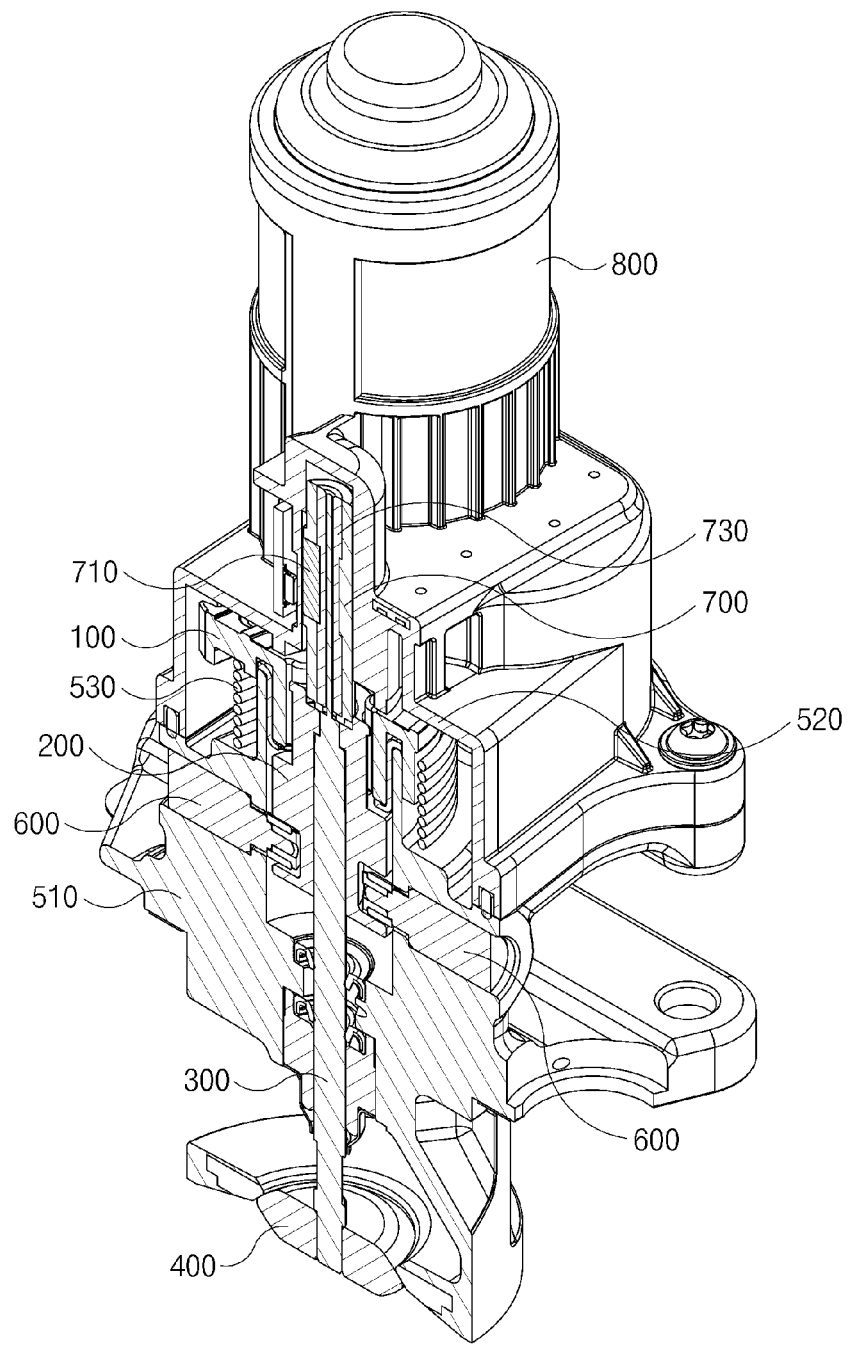

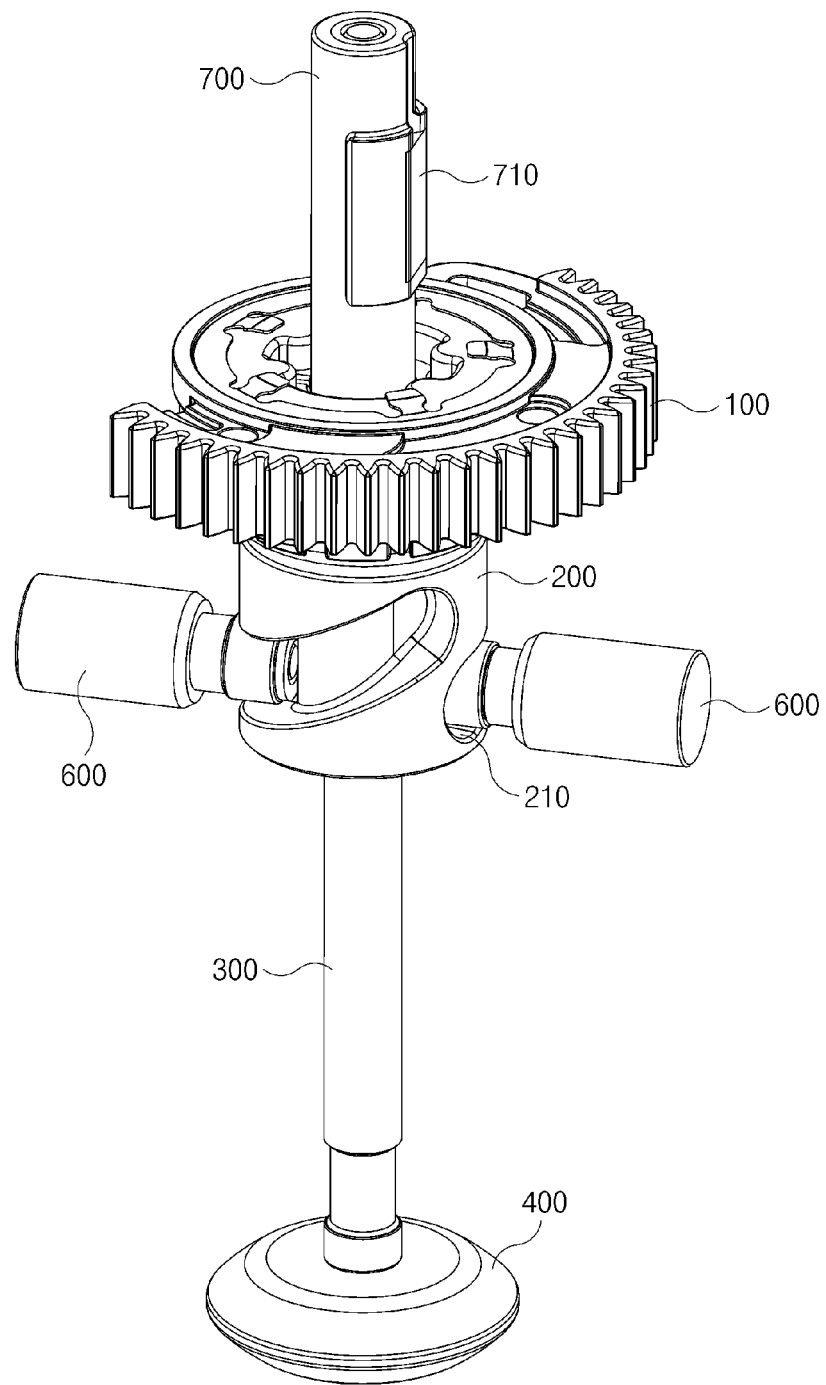
[Fig. 3]

[Fig. 4]
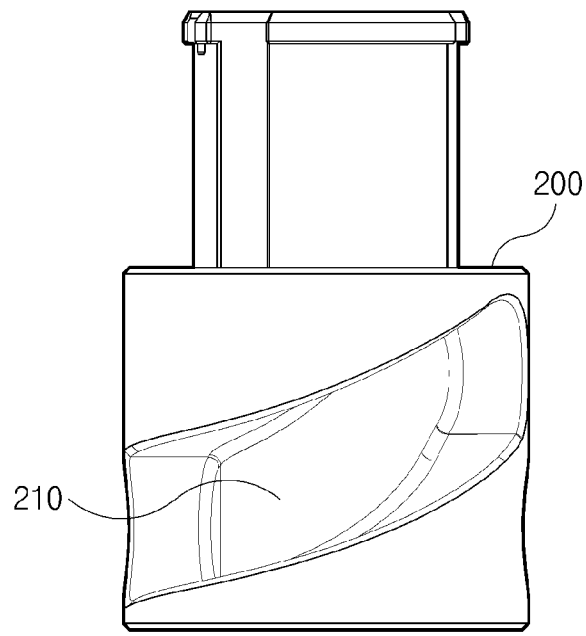

[Fig. 5]
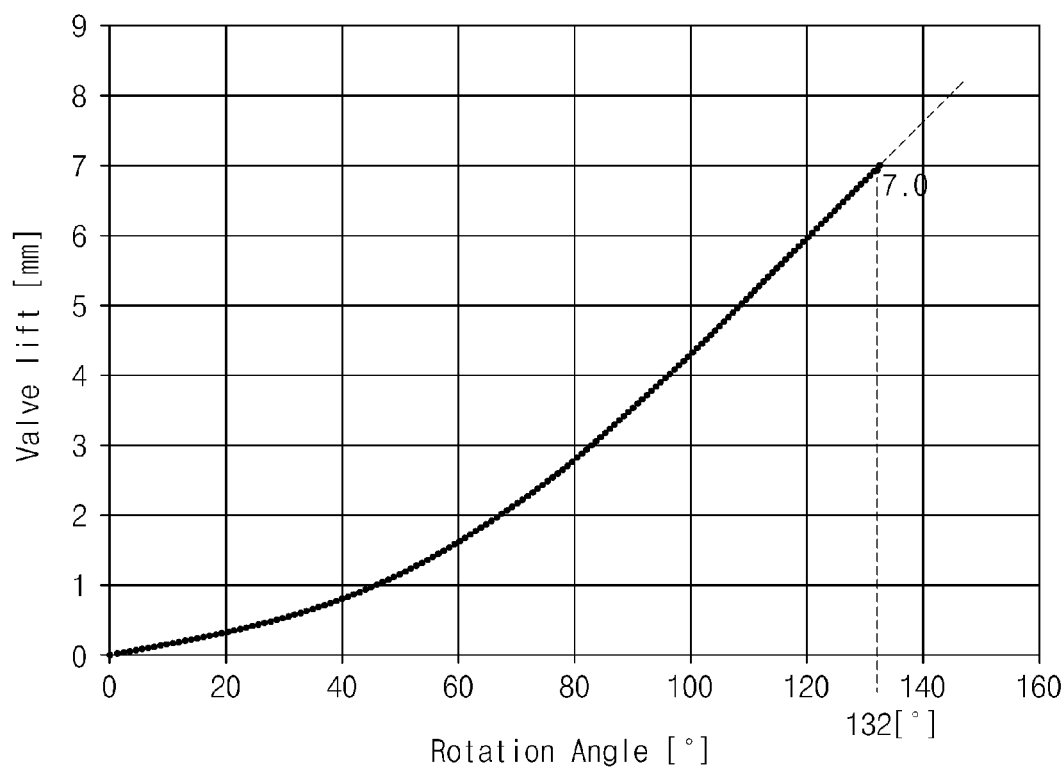

[Fig. 6]
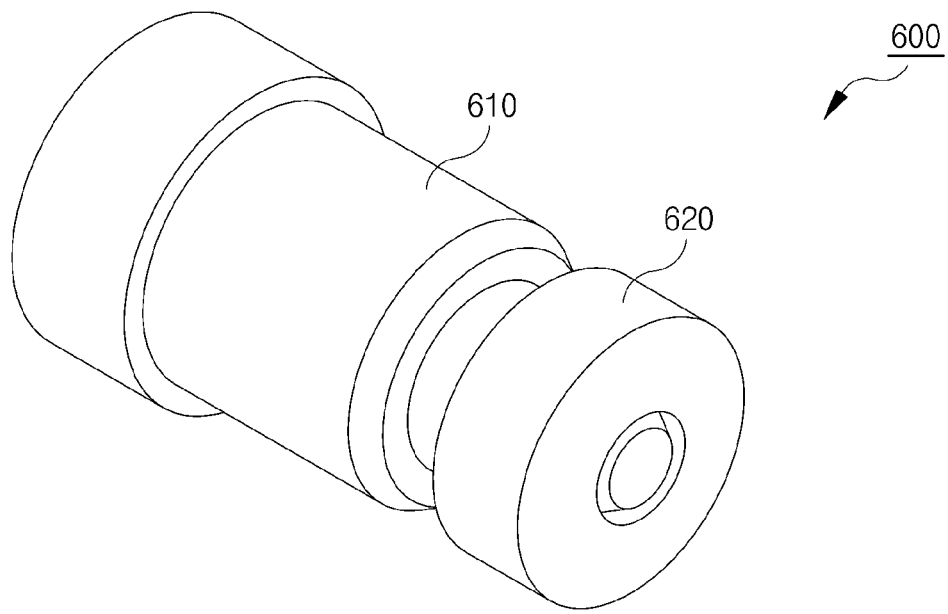
[Fig. 7]
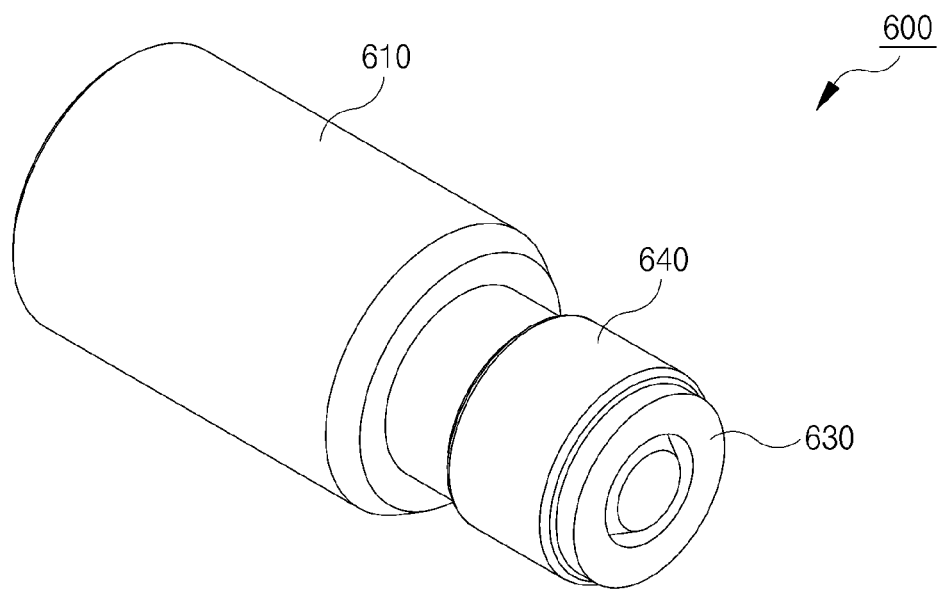

[Fig. 8]
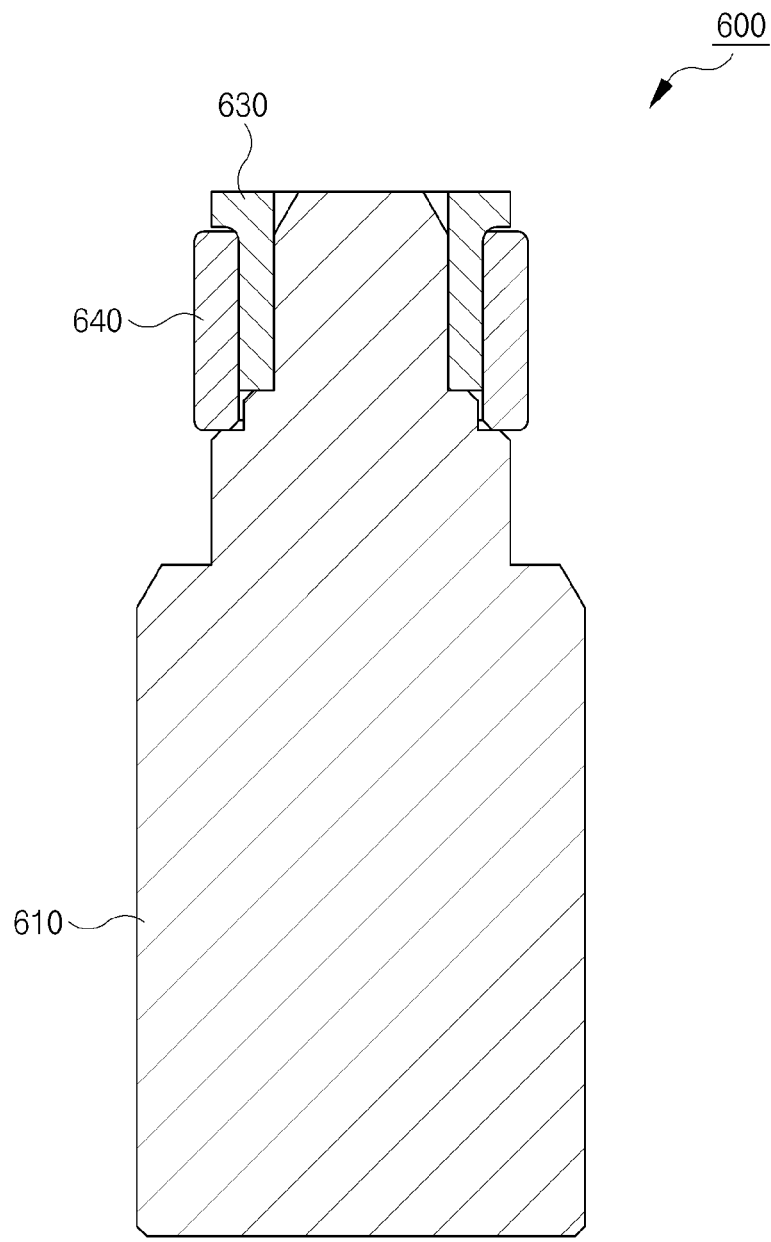

[Fig. 9]
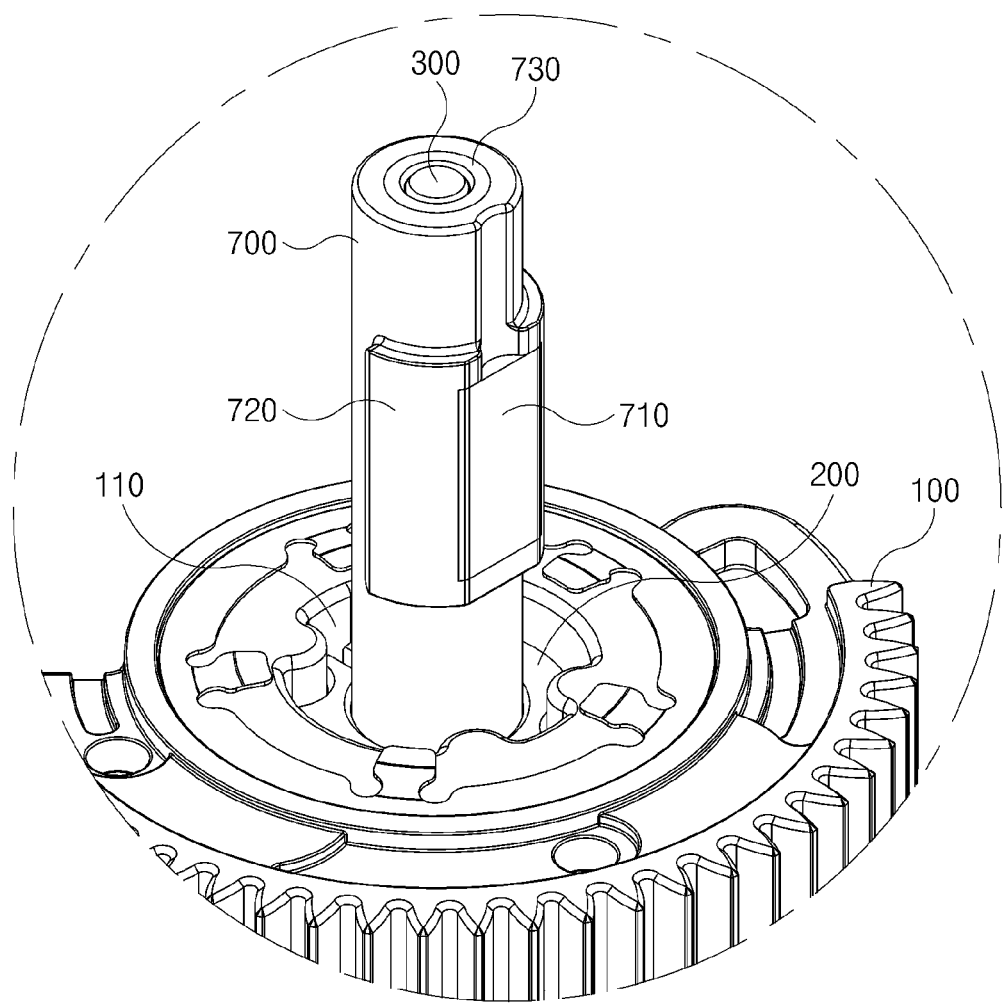

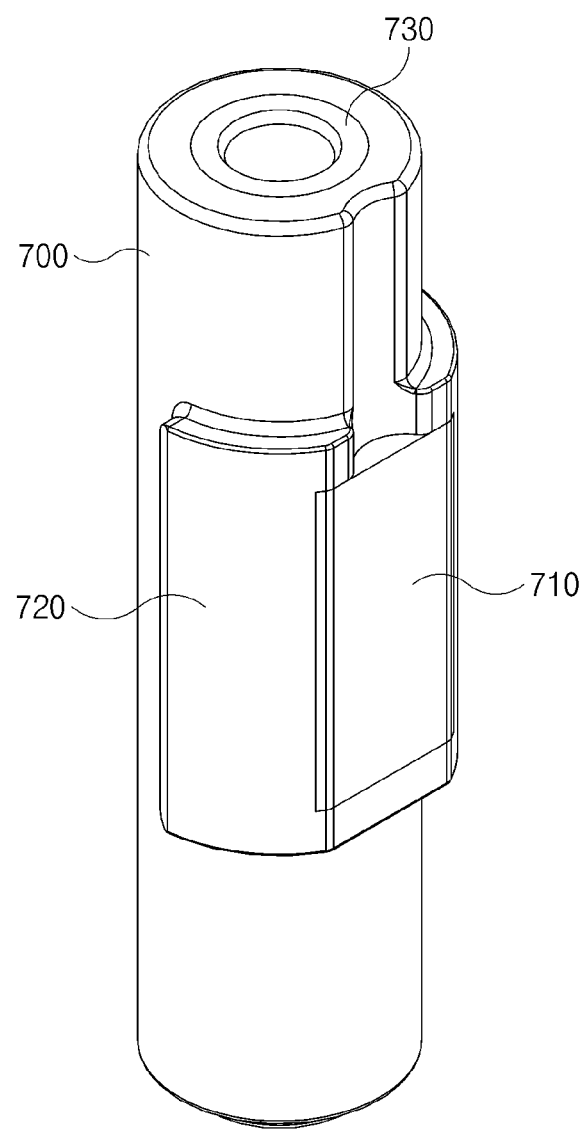
[Fig. 10]

VALVE ASSEMBLY HAVING IMPROVED CYLINDRICAL CAM OPERATION

TECHNICAL FIELD

The present invention relates to a valve assembly that moves up and down a valve seat by changing a rotation motion into a straight motion using a cylindrical cam and, more particularly, to a valve assembly in which the operation of a cylindrical cam is improved such that the cylindrical cam can more smoothly change a rotary motion into a straight motion without inclining to a side.

BACKGROUND ART

In general, the exhaust gas of vehicles is gas that is discharged to the atmosphere through an exhaust manifold after fuel is compressed and expanded at high temperature and high pressure in a cylinder. Most of the exhaust gas is vapor and carbon dioxide, and noxious substances such as carbon oxide (CO), hydrocarbon (HC), nitrogen oxide (NOx) are included.

An Exhaust Gas Recirculation System (EGR), which is a device that reduces nitrogen oxide of exhaust gas, reduces the production amount of nitrogen oxide (NOx) by decreasing combustion temperature when a gas mixture is burned, by returning some of exhaust gas back into an intake manifold. That is, it is possible to reduce the production amount of nitrogen oxide (NOx) by decreasing combustion temperature and the combustion temperature is the most influenced by combustion speed, so density is decreased without changing the air-fuel ratio of the gas mixture in a cylinder. Accordingly, when the combustion speed is decreased and an increase of combustion temperature is suppressed, nitrogen oxide can be reduced.

Meanwhile, an exhaust gas recirculation valve (hereafter, referred to as an 'EGR valve') is disposed between an exhaust manifold and an intake manifold and a passage is opened and closed by controlling the EGR valve only during revolution excepting idling and warming-up. The EGR valve is not operated before idling and warning-up, but is opened in accordance with the opening amount of a throttle valve during revolution excepting idling and warning-up, whereby some of exhaust gas is re-circulated to the intake manifold of an engine. Accordingly, reduction of engine power is minimized and combustion temperature is decreased, thereby reducing the exhaust amount of nitrogen oxide (NOx).

Existing EGR valves having this configuration are designed to change a rotary motion into a straight motion using a fixed cylindrical cam. However, according to these EGR valves, when a valve seat opens a passage, it is not only moved up and down, but rotated. Accordingly, there is a problem that wear of the valve seat is increased and reliability in opening and closing is reduced.

In order to solve this problem, a valve assembly configured such that a valve seat only moves up and down without rotating when opening and closing a passage (Korean Patent No. 10-1604415) by the applicant(s) has been applied and registered.

A valve assembly in the related art is described hereafter in detail with reference to accompanying drawings.

FIG. 1 is a perspective view of a valve assembly in the related art.

A valve assembly in the related art, as shown in FIG. 1, includes: a rotary gear 10 being rotated with a vertical central axis that is a rotational axis by force applied from the outside, and having a polygonal hole 11 on the central axis; a cylindrical cam 20 having a polygonal head 22, which is inserted in the polygonal hole 11, at an upper portion and having an inclined slide groove 21 on the outer side; a poppet shaft 30 disposed through the rotational center of the cylindrical cam 20; a valve seat 40 coupled to a lower portion of the poppet shaft; a housing (not shown) surrounding the cylindrical cam 20; and a bearing unit 60 having a side slidably inserted in the slide groove 21 and the other side fixed to the housing.

The polygonal head 22 disposed at the upper portion of the cylindrical cam 20 is manufactured slightly smaller than the polygonal hole 11 of the rotary gear 10. The cylindrical cam 20 rotates integrally with the rotary gear 10 when the rotary gear 10 rotates, but it can independently move up or down while keeping coupled to the rotary gear 10 when vertical force is applied from the outside. That is, when the rotary gear 10 is rotated with the polygonal head 22 inserted in the polygonal hole 11 and a side of the bearing unit 60 inserted in the slide groove 21, the cylindrical cam 20 is rotated with the rotary gear and the side of the bearing unit 60 slides in the longitudinal direction of the slide groove 21. Since the bearing unit 60 is fixed to the housing, the cylindrical cam 20 is rotated. The valve assembly according to the related art is characterized by being configured such that the cylindrical cam 20 vertically moves the poppet shaft 30 and the valve seat 40 coupled to the poppet shaft 30 while performing both rotation and vertical motion, rather than performing only one of rotation and vertical motion.

The poppet shaft is formed in rod shape (circular rod shape) having a circular horizontal cross-section to be able to independently rotate from the cylindrical cam 20. Further, the poppet shaft 30 has a step at a middle portion inserted in the cylindrical cam 20 to be able to move up and down integrally with the cylindrical cam 20 and has a disc-shaped flange at a portion corresponding to the top of the cylindrical cam 20. Accordingly, when the cylindrical cam 20 moves up and down while rotating, the poppet shaft 30 and the valve seat 40 coupled to the poppet shaft 30 only move up and down with the cylindrical cam 20 without rotating.

However, according to the valve assembly in the related art, only one bearing unit 60 is connected to a side of the cylindrical cam 20, so when the bearing unit 60 slides along the slide groove 21, the bearing unit 60 may incline to a side. Further, when the valve seat 40 moves up and down at very high speed when closing a passage, it is difficult to finely adjust the flow rate of exhaust gas and the valve seat may be damaged by large shock that is applied to the valve seat.

Further, the valve assembly in the related art has another problem of high manufacturing cost and low durability of the bearing unit. Further, since the poppet shaft 30 and a magnet 50 are separately manufactured and then combined, the manufacturing process is complicated and the magnet 50 may be separated from the poppet shaft 30.

DISCLOSURE

Technical Problem

The present invention has been made in an effort to solve the problems and an object of the present invention is to provide a valve assembly in which a cylindrical cam can finely adjust the flow rate of exhaust gas without inclining to a side when it moves up and down while rotating, the manufacturing cost of a bearing unit can be reduced, the durability of the bearing unit can be improved, and the fastening force of a magnet is improved.

Technical Solution

In order to achieve the objects, a valve assembly having improved cylindrical cam operation according to the present invention includes: a rotary gear being rotated about a vertical central axis that is a rotational axis by force applied from an outside, and having a non-circular insertion hole on the central axis; a cylindrical cam being able to move up and down while rotating integrally with the rotary gear with an upper end thereof inserted in the insertion hole, and having two or more inclined slide grooves on an outer side thereof; a poppet shaft disposed through the rotational axis of the cylindrical cam to be able to move up and down integrally with and rotate independently from the cylindrical cam; a valve seat coupled to a lower portion of the poppet shaft; a housing and a cover that surround the cylindrical cam; and two or more bearing unit each having a first side fixed to the housing and having second sides respectively inserted in the slide grooves.

Two slide grooves may be formed at opposite sides with the rotational axis of the cylindrical cam therebetween.

A gradient of the slide grooves may be smaller at a lower portion than an upper portion.

The upper portion of the slide grooves may be formed straight and the lower portion of the slide grooves may be formed in a curved shape such that the gradient decreases downward.

The bearing unit may include: a bearing shaft formed in a cylindrical shape and having a longitudinal first side fixed to the housing and a longitudinal second side having a small outer diameter; a ring-shaped bearing bush coupled to surround the longitudinal second side of the bearing shaft; and a roller coupled to surround an outer side of the bearing bush and seated in the slide groove, and the bearing bush may be formed in an enlarging pipe shape such that an outer diameter of an end facing the slide groove is larger than an inner diameter of the roller.

An upper portion of the poppet shaft may protrude over the cylindrical cam, the valve assembly may further include: a guide pipe formed in a hollow pipe shape in which the upper portion of the poppet shaft is inserted, and that has a sliding protrusion having a vertical length and formed on an outer side thereof; and a magnet fixed to the outer side of the guide pipe, and a guide groove in which the sliding protrusion is inserted to be movable up and down may be formed in an inner side of the cover.

The guide pipe may be made of synthetic resin, and the guide pipe and the magnet may be integrally formed by insert injection molding.

An insert pipe made of metal may be additionally provided on an inner side of the guide pipe, and the insert pipe and the poppet shaft may be integrally combined by welding.

Advantageous Effects

The valve assembly according to the present invention has the advantage that the valve seat can be stably moved up and down because the cylindrical cam does not incline to a side when it moves up and down while rotating, it is possible to finely adjust the flow rate of exhaust gas, it is possible to prevent damage to the valve seat, it is possible to reduce the manufacturing cost of the bearing unit and improve the durability of the bearing unit, the fastening force of the magnet is improved, and the vertical movement direction of the poppet shaft is kept constant.

DESCRIPTION OF DRAWINGS

FIG. 1 is a perspective view of a valve assembly in the related art.

FIG. 2 is a cross-sectional perspective view showing the internal structure of a valve assembly according to the present invention.

FIG. 3 is a perspective view showing a structure when a bearing unit is mounted on a cylindrical cam.

FIG. 4 is a side view of the cylindrical cam.

FIG. 5 is a graph showing the gradient of a slide groove using a line.

FIGS. 6 and 7 are perspective views of a bearing unit.

FIG. 8 is a cross-sectional view of the bearing unit shown in FIG. 7.

FIG. 9 is a perspective view showing a coupling structure of a guide pipe.

FIG. 10 is a perspective view of the guide pipe.

MODE FOR INVENTION

An embodiment of a valve assembly with improved cylindrical cam operation according to the present invention is described in detail hereafter.

FIG. 2 is a cross-sectional perspective view showing the internal structure of a valve assembly according to the present invention and FIG. 3 is a perspective view showing a structure when a bearing unit is mounted on a cylindrical cam.

A valve assembly using a cylindrical cam 200 according to the present invention is an apparatus for moving up and down a valve seat 400 by changing torque transmitted from the outside into straight feeding force. As shown in FIGS. 2 and 3, the valve assembly includes: a rotary gear 100 being rotated about a vertical central axis that is a rotational axis by force applied from the outside, and having a non-circular insertion hole 110 on the central axis; a cylindrical cam 200 being able to move up and down while rotating integrally with the rotary gear 100 with an upper end thereof inserted in the insertion hole 110, and having two or more inclined slide grooves 210 on an outer side thereof; a poppet shaft 300 disposed through the rotational axis of the cylindrical cam 200 to be able to move up and down integrally with and rotate independently from the cylindrical cam 200; a valve seat 400 coupled to a lower portion of the poppet shaft 300; a housing 510 and a cover 520 that surround the cylindrical cam 200; and two or more bearing unit 600 each having a first side fixed to the housing 510 and a second side and having second sides respectively inserted in the slide grooves 210.

The rotary gear 100 has a cap shape with the edge extending downward and has gear teeth on the outer side of the portion extending downward to be rotated by torque provided from a driving motor 800. In general, torque of the driving motor 800 is very fast, so the torque may be reduced through a plurality of gears and then transmitted to the rotary gear 100.

When the insertion hole 110 and the upper end inserted in the insertion hole 110 of the cylindrical cam 200 are formed in a circular shape, the cylindrical cam 200 and the rotary gear 100 may independently rotate. Accordingly, the insertion hole 110 is formed not in a circular shape, but, for example, may be formed in a shape with a protrusion on the inner side, as shown in this embodiment. Further, the upper end of the cylindrical cam 200 may be formed in a shape corresponding to the insertion hole 110. The insertion hole 110 may be formed in polygonal shapes or other various metaphysical shapes, as long as it can be formed in a non-circular shape, that is, it is formed in a shape that is not a circular shape.

Meanwhile, the upper end of the cylindrical cam 200 is formed in a shape corresponding to the insertion hole 110 of the rotary gear and has a slightly smaller size than the insertion hole 110. Accordingly, the cylindrical cam 200 integrally rotates with the rotary gear 100 when the rotary gear 100 rotates, but the cylindrical cam 200 can independently move up or down while keeping coupled to the rotary gear 100 when vertical force is applied from the outside. That is, when the driving motor 800 is operated and the rotary gear 800 is rotated with the upper end of the cylindrical cam 200 inserted in the insertion hole 110 and second ends of the bearing units 600 inserted in the slide grooves 210, the cylindrical cam 200 is rotated with the rotary gear 100 and the second sides of the bearing units 600 slide in the longitudinal direction of the slide grooves 210. Since the bearing units 600 are fixed to the housing 510, the cylindrical cam 200 is rotated. The valve assembly according to the present invention is configured such that the cylindrical cam 200 vertically moves the poppet shaft 300 and the valve seat 400 coupled to the poppet shaft 300 while performing both of rotation and vertical motion, not only one of rotation and vertical motion. The poppet shaft 300 is formed in rod shape (circular rod shape) having a circular horizontal cross-section to be able to independently rotate from the cylindrical cam 200. Further, the poppet shaft 300 has a step at a middle portion inserted in the cylindrical cam 200 to be able to move up and down integrally with the cylindrical cam 200 and has a disc-shaped flange at a portion corresponding to the top of the cylindrical cam 200. Accordingly, when the cylindrical cam 200 performs both rotation and vertical motion, the poppet shaft 300 and the valve seat 400 only move up and down, and this operational structure is equally applied to valve assemblies of the related art, so it is not described in detail.

Meanwhile, when the cylindrical cam 200 moves up, only the cylindrical cam 200 should move up with the rotary gear 100 moving up, but the rotary gear 100 may be moved up with the cylindrical cam 200 by friction between an upper portion of the cylindrical cam 200 and the insertion hole 110. Operation noise and vibration may be generated when the rotary gear 100 is moved up and down with the cylindrical cam 200, as described above, so a return spring 530 that applies upward elasticity to the rotary gear 100 is disposed between the bottom of the rotary gear 100 and the top of the housing 510. When the return spring 530 is provided, as described above, the rotary gear 100 keeps in contact with the cover 520, so the rotary gear 100 is not moved up and down with the cylindrical cam 200.

Meanwhile, the cylindrical cam 200 receives vertical force while the bearing units 600 slide in the slide grooves 210. If the bearing unit 600 is mounted only on one side of the cylindrical cam 200, the vertical force transmitted through the bearing unit 600 concentrates on only any one side of the cylindrical cam 200, so the cylindrical cam 200 may be inclined to a side. When the cylindrical cam 200 inclines to a side, as described above, the cylindrical cam 200 is stuck in the housing 510, and accordingly, the cylindrical cam 200 cannot normally move up and down. Accordingly, the valve seat 400 may not be smoothly opened and closed.

In order to solve this problem, the valve assembly of the present invention is characterized in that the slide grooves 210 are disposed at opposite sides with the rotational axis of the cylindrical cam 200 therebetween and the bearing units 60 are also disposed at the positions where the slide grooves 210 are formed. As described above, when the bearing units 600 are mounted on both sides of the cylindrical cam 200, the vertical force that moves up and down the cylindrical cam 200 is uniformly distributed, so the cylindrical cam 200 does not incline to any one side.

Although the case in which two slide grooves 210 are formed on one cylindrical cam 200 and two bearing units 600 are provided in this embodiment, the numbers of the slide grooves 210 and the bearing units 600 may be changed to three or more. Obviously, when three of more slide grooves 210 and bearing units 600 are provided, the slide grooves 210 and the bearing units 600 may be circumferentially arranged around the rotational axis of the cylindrical cam 200.

As described above, the larger the numbers of the slide grooves 210 and the bearing units 600, the more the effect that the cylindrical cam 200 vertically moves up and down without inclining to any one side is improved, but the larger the numbers of the slide grooves 210 and the bearing units 600, the larger the friction force, so the cylindrical cam 200 may not smoothly move up and down. Accordingly, unless the cylindrical cam 200 inclines to any one side even if one slide groove 210 and one bearing unit 600 are disposed respectively on both sides of the cylindrical cam 200, one slide groove 210 and one bearing unit 600 may be provided at opposite sides with the rotational axis of the cylindrical cam 200 therebetween.

FIG. 4 is a side view of the cylindrical cam 200 and FIG. 5 is a graph showing the gradient of the slide grooves 210 using a line.

The gradient of the slide grooves 210 should be large for fast opening and closing by the valve seat 400. However, when the gradient of the slide grooves 210 is large, the valve set 400 opens and closes fast the inlet of a channel, so it is difficult to finely adjust the flow rate of exhaust gas. Further, when the valve seat 400 is moved up and down fast, the valve seat 400 hits quickly against the channel inlet, so the valve seat 400 may be damaged. Obviously, it is possible to reduce the moving-up/down speed of the valve seat 400 by making the gradient of the slide grooves 210 gentle, but opening and closing by the valve seat 400 take long time in this case.

In order to solve this problem, in the valve assembly according to the present invention, the gradient of the sliding grooves 210 may be smaller at the lower portion than the upper portion so that the time for opening and closing the valve assembly is maintained under a predetermined level and the valve seat 400 can be slowly seated on a channel inlet.

When the gradient of the lower portions of the slide grooves 210 is gentle, as described above, it is possible to reduce the moving-up/down speed of the valve seat 400 only at the moment when the valve seat 400 is seated on a channel inlet while keeping the entire moving-up/down speed of the valve seat 400 high. Accordingly, it is possible to finely adjust the flow rate of exhaust gas and prevent damage to the valve seat 400.

If the sections with a small gradient of the slide grooves 210 are formed straight, a bending point is formed between the sections with a large gradient and a small gradient, so the valve seat 400 may not be smoothly moved up and down. Accordingly, the upper portions of the slide grooves 210 may be formed straight and the lower portion of the slide grooves 210 may be formed in a curved shape such that the gradient decreases downward. The gradient of portions of the slide grooves 210 may be changed in various ways in accordance with various conditions such as the usage of the valve assembly according to the present invention and the strength of the valve seat 400, which is not described in detail.

FIGS. 6 and 7 are perspective views of a bearing unit 600 and FIG. 8 is a cross-sectional view of the bearing unit 600 shown in FIG. 7.

The bearing units 600 included in the present invention, similar to the bearing unit 60 of the related art, that is, as shown in FIG. 6, may be composed of a bearing shaft 610 formed in a cylindrical shape and having a longitudinal first side (the left side in FIG. 6) fixed to the housing 510 and a longitudinal second side (the right side in FIG. 6) having a small outer diameter, and a ball bearing 620 coupled to surround the second side of the bearing shaft 610. However, the price of the ball bearing 620 is high, so there is a limit in reducing the entire manufacturing cost of the bearing units 600. Further, the outer race of the ball bearing 620 that is a ready-made article is large, so it is required to form the slide grooves 210 and the cylindrical cam 200 large, and accordingly, it is difficult to make the valve assembly compact.

In order to solve this problem, as shown in FIGS. 7 and 8, the bearing unit 600 may be composed of a bearing shaft 610 formed in a cylindrical shape and having a longitudinal first side fixed to the housing 510 and a longitudinal second side having a small outer diameter, a ring-shaped bearing bush 630 coupled to surround the longitudinal second side of the bearing shaft 610, and a roller 640 coupled to surround the outer side of the bearing bush 630 and seated in the slide groove 210. The bearing bush 630 is made of synthetic resin having high wear resistance, so the roller 640 can be smoothly rotated. Further, the bearing bush 630 is formed in an enlarging pipe shape such that the outer diameter of the end facing the slide groove 210 is larger than the inner diameter of the roller 640, so the roller 640 cannot be freely separated.

The prices of the bearing bush 630 and the roller 640 are lower than the price of the ball bearing 620, so the manufacturing cost of the bearing unit 600 can be reduced. Further, when the ball bearing 620 is replaced with the bearing bush 630 and the roller 640, the outer diameter of the roller 640 can be reduced. Accordingly, the dimensions of the cylindrical cam 200 can be reduced, and thus, the valve assembly can be made compact.

FIG. 9 is a perspective view showing a coupling structure of a guide pipe 700 and FIG. 10 is a perspective view of the guide pipe 700.

As long as friction force between the poppet shaft 300 and the cylindrical cam 200 is maintained at a predetermined level or more even though the poppet shaft 300 that receives vertical force from the cylindrical cam 200 is formed in a circular rod shape, the poppet shaft 300 may be rotated a predetermined angle with the cylindrical cam 200. Accordingly, in order to forcibly prevent rotation of the poppet shaft 300, that is, enable the poppet shaft 300 only to move up and down without rotating, the guide pipe 700 may be additionally mounted on the portion protruding over the cylindrical cam 200 of the poppet shaft 300.

The guide pipe 700 is formed in a hollow pipe shape in which the upper portion of the poppet shaft 300 is inserted, and has a sliding protrusion 720 having a vertical length and formed on the outer side thereof, and a guide groove (not shown) in which the sliding protrusion 720 is inserted to be movable up and down is formed on the inner side of the cover 520. Accordingly, the poppet shaft 700 only moves up and down without rotating unless the guide pipe 700 is separated or damaged.

Meanwhile, a magnet 710 for measuring the vertical movement distance of the poppet shaft 300 is mounted on the outer side of the guide pipe 700. The magnet 710 may be integrally combined with the guide pipe 700 in order not to separate from the guide pipe 700. For example, when the guide pipe 700 is made of synthetic resin, the magnet 710 may be integrally formed with the guide pipe 700 by insert injection molding. As described above, when the magnet 710 is integrally formed with the guide pipe 700, there is no possibility that the magnet 710 is separated from the guide pipe 700, so it is possible to accurately measure the vertical movement distance of the poppet shaft 300.

However, when the guide pipe 700 is made of synthetic resin, the guide pipe 700 is difficult to be firmly coupled to the poppet shaft 300 that is made of steel. Accordingly, the guide pipe 700 included in the present invention has an insert pipe 730 made of metal on the inner side of to be able solve this problem.

The insert pipe 730 is integrally formed with the guide pipe 700 by insert injection molding. As described above, when the insert pipe 730 made of metal is provided on the inner side of the guide pipe 700, it is possible to firmly combine the guide pipe 700 and the poppet shaft 300 by welding the insert pipe 730 and the poppet shaft 300.

Although the present invention was described above in detail by means of embodiments, the present invention is not limited to the specific embodiments and should be construed on the basis of claims. Further, it should be understood that the present invention may be changed and modified in various ways by those skilled in the art without departing from the scope of the present invention. In the following description, the structural or functional description specified to exemplary embodiments according to the concept of the present invention is intended to describe the exemplary embodiments, so it should be understood that the present invention may be variously embodied, without being limited to the exemplary embodiments. It should be understood that the exemplary embodiments according to the concept of the present invention are not limited to the embodiments which will be described hereinbelow with reference to the accompanying drawings, but various modifications, equivalents, additions and substitutions are possible, without departing from the scope and spirit of the invention.

The invention claimed is:

1. A valve assembly comprising:
   a rotary gear being rotated about a vertical central axis that is a rotational axis by force applied from an outside, and having a non-circular insertion hole on the central axis;
   a cylindrical cam being able to move up and down while rotating integrally with the rotary gear with an upper end thereof inserted in the insertion hole, and having two or more inclined slide grooves on an outer side thereof;
   a poppet shaft disposed through the rotational axis of the cylindrical cam to be able to move up and down integrally with and rotate independently from the cylindrical cam;
   a valve seat coupled to a lower portion of the poppet shaft;
   a housing and a cover that surround the cylindrical cam; and two or more bearing unit each having a first side fixed to the housing and having second sides respectively inserted in the slide grooves.

2. The valve assembly of claim 1, wherein two slide grooves are formed at opposite sides with the rotational axis of the cylindrical cam therebetween.

3. The valve assembly of claim 1, wherein a gradient of the slide grooves is smaller at a lower portion than an upper portion.

4. The valve assembly of claim 3, wherein the upper portion of the slide grooves is formed straight and the lower portion of the slide grooves is formed in a curved shape such that the gradient decreases downward.

5. The valve assembly of claim 1, wherein the bearing unit includes: a bearing shaft formed in a cylindrical shape and having a longitudinal first side fixed to the housing and a longitudinal second side having a small outer diameter; a ring-shaped bearing bush coupled to surround the longitudinal second side of the bearing shaft; and a roller coupled to surround an outer side of the bearing bush and seated in the slide groove, and the bearing bush is formed in an enlarging pipe shape such that an outer diameter of an end facing the slide groove is larger than an inner diameter of the roller.

6. The valve assembly of claim 1, wherein an upper portion of the poppet shaft protrudes over the cylindrical cam, the valve assembly further comprises:

a guide pipe formed in a hollow pipe shape in which the upper portion of the poppet shaft is inserted, and that has a sliding protrusion having a vertical length and formed on an outer side thereof; and a magnet fixed to the outer side of the guide pipe, and a guide groove in which the sliding protrusion is inserted to be movable up and down is formed in an inner side of the cover.

7. The valve assembly of claim 6, wherein the guide pipe is made of synthetic resin, and the guide pipe and the magnet are integrally formed by insert injection molding.

8. The valve assembly of claim 7, wherein an insert pipe made of metal is additionally provided on an inner side of the guide pipe, and the insert pipe and the poppet shaft are integrally combined by welding.

* * * * *